July 4, 1961  J. L. W. CHURCHILL  2,991,365
RADIOACTIVITY INFORMATION RECORDING APPARATUS
Filed May 31, 1957
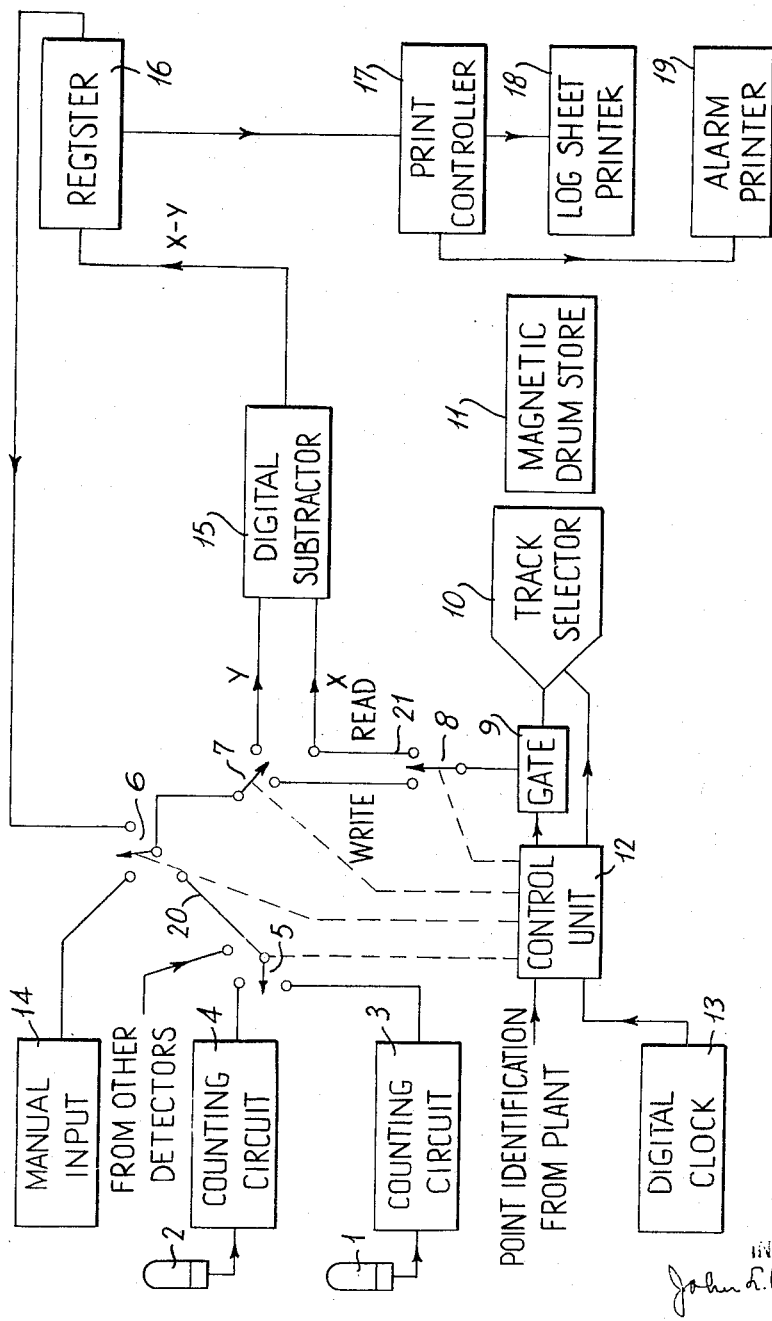
INVENTOR
John L. W. Churchill
By Morris & Bateman
ATTORNEYS United States Patent Office 2,991,365
Patented July 4, 1961

2,991,365
RADIOACTIVITY INFORMATION RECORDING APPARATUS
John Leslie Weston Churchill, Harlow, England, assignor to Sunvic Controls Limited, London, England, a British company
Filed May 31, 1957, Ser. No. 662,686
Claims priority, application Great Britain June 21, 1956
2 Claims. (Cl. 250—83.3)

This invention relates to apparatus for recording information from a number of sources at fixed time intervals.

The invention has an important application in nuclear reactors. It has, however, other applications and may for example be employed in process control for logging information from a number of different stages in a process.

Graphite moderated reactors require large numbers of fuel elements operating close to their maximum design temperatures. It therefore, becomes imperative for the activity levels in all channels to be monitored at frequent regular intervals. Furthermore, in case of failure it is necessary to identify the element which has failed and also to inspect conditions over a preceding time period, say 24 hours preceding the failure, in order that the cause of failure may be diagnosed. It has, however, been found that storage of information for any length of time is unnecessary and in fact undesirable, as it is wasteful of space.

The main object of the invention is to provide an improved monitoring arrangement satisfying the above requirements.

According to the present invention information recording apparatus comprises means for obtaining information readings from a number of different sources at predetermined intervals and for converting such information into digital form, means for subtracting each reading from the previous reading from the same source to derive an incremental reading, means for comparing each reading and each incremental reading with respective standard values, means for indicating whether any of these values are exceeded and a storage device for storing readings obtained over a period of time.

Preferably the operation of the apparatus is controlled so that readings are obtained at regular intervals.

The storage device may be arranged to store a predetermined number of sequential readings from each source and after said number of readings have been obtained each additional reading may be entered in place of the earliest remaining reading from the same source. Alternatively instead of recording the absolute values of the readings each successive incremental reading may be recorded instead, only the last absolute reading being retained.

The storage device may conveniently be a magnetic storage drum although the invention is not limited in this respect.

In the application of the invention to logging the states of the fuel cartridges in a nuclear reactor, as above referred to, the input information would be derived from counters responsive to the radiation from a member, e.g. a wire, which in turn has been exposed to the radiation from a fuel member for a predetermined length of time.

The digital data is preferably in binary form but not necessarily so as it may be in decimal or other suitable scales.

In order that the invention may be more clearly understood reference will now be made to the accompanying drawing, which shows in block form an example of apparatus suitable for monitoring and logging the states of the fuel elements of a nuclear reactor.

It will be appreciated that in a reactor there will be a number of fuel elements and these may be divided up into annular groups. It is assumed that there will be one detector associated with each group and each detector will inspect all the fuel elements in that group in turn and the information will be passed to a store.

In the drawing only two detectors 1 and 2 are shown together with their respective associated counting circuits 3 and 4. It will be appreciated however, that in practice there may be many more. Each counting circuit will store the reading obtained by its associated detector preferably in binary digital form. The output of each counting circuit is connected through a switch 5 to a common input line 20 and further switches 6, 7 and 8, the purpose of which will be described more fully hereafter, through a gate 9 and track selector 10 to a magnetic drum store 11. Each of the switches and gate 9 and track selector 10 are controlled from a control unit 12 which controls the entire operational sequence of the apparatus. The rate of operation of control unit 12 is controlled from a digital clock 13.

By means of switch 6 a manual input 14 can be coupled to the apparatus for the purpose of entering standard values or instructions.

The arithmetic operations of the apparatus are carried out by a digital subtractor 15 and a register 16. The minuend input X to the subtractor is obtained from the magnetic drum store 11 through switch 8 and read line 21. The subtrahend input Y to subtractor 15 is obtained from the output of register 16 through switches 6 and 7. In addition switch 6 can be manipulated so that a manual input from 14 can be entered into the Y input of the subtractor. The output of subtractor 15, namely $X-Y$, is fed to register 16. Register 16 includes a sign detector unit as will be described hereafter and the number registered therein can be printed out under the control of a print controller either to a log sheet printer 18 for normal logging of the state of the fuel reactor elements or to an alarm printer 19 when predetermined values are exceeded.

Where store 11 is a rotatable magnetic drum the readings may be stored serially along different tracks around the drum and in such cases control unit 12 will operate track selector 10 to select the appropriate track.

It will be appreciated that a state of danger may be indicated firstly by an absolute reading which exceeds a predetermined level and secondly by a rapid increase in absolute values.

To allow for the first danger condition the absolute values are subtracted from a fixed reference value and if the change is negative, indicating that the safe value has been exceeded, alarm apparatus is operated.

The second danger condition is allowed for by subtracting each absolute value from the previous absolute value and comparing the difference, i.e. the increment with a reference value of increment, again alarm apparatus is operated if the reference value of increment is exceeded.

It will be appreciated that the reference values both of absolute values and of increments will normally vary according to the position in the core. Thus different reference values can be used for the reading obtained from each metering position. It is, moreover, possible to adjust the reference values as a result of experience gained.

When danger conditions arise it may be necessary to refer to the preceding readings and for this purpose an alarm printer 19 may be provided which will print out the sequence of readings from an selected source over a preceding period. This may also print out the readings on a digital clock which correspond with the times of the readings. For convenience the numbers would normally be converted from binary to decimal code before printing.

The sequence of operations can be obtained either by a built-in sub-circuit wiring or by instructions stored in the drum in accordance with well-known digital computor practice. In either case the apparatus is indicated diagrammatically as being controlled by control unit 12 from which control lines radiate to control the various switches, gate 9 and the track selector 10 of the magnetic drum.

The sequence of operations of the apparatus is as follows: initial information on the maximum absolute reading and on the maximum allowable incremental reading for each annular zone of the core and each channel in the zone is written into predetermined locations on drum 11 through manual input 14.

Input readings are accumulated on counting circuits 3 and 4 simultaneously and at the termination of the counting period the counts are read off and put into storage in appropriate positions on drum 11. Each of the numbers put into the store are then taken one at a time and operated on as follows:

(i) A particular reading is fed out from store 11 through read line 21 and input X of subtractor 15 to register 16. No input is fed to the Y side of the subtractor 15 and so the number arrives at register 16 unchanged.

(ii) The next successive reading obtained from the same detector is now read out from store 11 into input X of the subtractor and simultaneously the number in register 16 is switched through to input Y of the subtractor. The output the subtractor as given by $X-Y$ is now fed to register 16 and this value is the increment between two successive readings.

(iii) The track selector now selects a previously written-in standard increment for the particular group being considered from magnetic drum store 11 and this number is fed into input X of the subtractor simultaneously with the number now in register 16 (the actual increment) being fed to input Y of the subtractor. If the actual increment is less than the maximum permitted increment the output of subtractor 15 will be positive. On the other hand if the actual increment exceeds the maximum permitted increment the output of subtractor 15 will have a negative sign. The sign detector included in register 16 will sound an alarm if a negative sign is received and will operate print controller 17 to cause the results to be printed out on alarm printer 19.

The above sequence of events thus provides a test as to whether there has been a too rapid rise in activity. A further test will be to determine whether the absolute value of a reading has exceeded a predetermined maximum and this is carried out as follows:

(iv) The reading is fed from the magnetic store through the X input of the subtractor to register 16 with no input at Y. The reading thus arrives unchanged at register 16.

(v) The maximum permitted value of the reading being considered, which has previously been written in the store 11, is now selected and fed to input X of the subtractor simultaneously with the reading on register 16 being switched through to input Y of the subtractor. If the reading is less than its maximum permitted value $X-Y$ is positive. On the other hand if the maximum permitted value is exceeded $X-Y$ is now negative and the negative sign on the number arriving at register 16 will cause the alarm to be sounded and alarm printer 19 to operate.

The above sequence of operations is repeated for each new piece of input information.

As abovementioned, it may not be desirable to retain readings for more than a predetermined period and in such a case the storage may be designed to hold readings for a period of say 24 hours and then the fresh readings are inserted in the positions previously occupied by the earliest readings which are erased successively for this purpose. In this manner any readings older than 24 hours are erased but there is always a record of readings for the preceding 24 hours.

The counting circuits and registers may conveniently follow normal digital practice and may, for instance, be constituted by bi-stable trigger circuits which are connected in sequence so as to effect carry-overs from one stage to the next.

Once every six hours for instance a "normal" logging print out takes place on log sheet pointer 18. This prints the time and the latest absolute activity readings on every group of four channels in the reactor core.

An "off normal" print out consists of printing the time, the point number, and the latest absolute activity of the point activity for that point. The operator may then demand all the previous 24 hours activity from that point.

When starting up, the arithmetic mentioned above cannot be performed since there are no previous measurements to refer to. The programme is arranged to allow the input mechanism one complete scan of the reactor core to write initial conditions into the store. Thereafter on succeeding scans the complete programme of arithmetic is performed.

The above sequence can be readily modified to include additional print out conditions or a different sequence of arithmetical operations by using a different programme. A self checking sequence is incorporated in the programme.

It will be appreciated that such apparatus is extremely flexible and both the reference values and the arithmetic programming can easily be changed.

Also it does not record continuously and hence records only useful information, the usefulness of which is not impaired by being included in a large amount of useless information.

By operating in digital form it is possible to avoid calibration errors such as occur with analogue apparatus e.g. those arising from using pen recorder techniques.

What I claim is:

1. Information recording apparatus comprising a plurality of detectors for obtaining quantitative information from a number of different sources, individual counting circuits associated with each detector arranged to convert such information into digital form, a digital storage device, recording means for recording information from each of said counting circuits into a predetermined location in said storage device, a digital subtractor having a minuend input and a subtrahend input, reading means for reading information from a predetermined location in said storage device and feeding said read information to said minuend input, a register for registering the output of said digital subtractor, an output connection from said register, switching means for switching said output connection to either said writing means or said subtrahend input, and means for indicating whether the output from said digital subtractor is positive or negative.

2. Information recording apparatus comprising a plurality of detectors for obtaining quantitative information from a number of different sources, individual counting circuits associated with each detector arranged to convert such information into digital form, a digital storage device, recording means for recording information from each of said counting circuits into a predetermined location in said storage device, a digital subtractor having a minuend input and a subtrahend input, reading means for reading information from a predetermined location in said storage device and feeding said read information to said minuend input, a register for registering the output of said digital subtractor, an output connection from said register, switching means for switching said output connection to either said writing means or said subtrahend input, a manual input, switching means for switching said manual input to said writing means and said subtrahend input, and means for indicating whether the output from said digital subtractor is positive or negative.

References Cited in the file of this patent

UNITED STATES PATENTS

| | | |
|---|---|---|
| 2,709,754 | Davidon | May 31, 1955 |
| 2,738,925 | Lapham et al. | Mar. 20, 1956 |
| 2,779,875 | Borkowski et al. | Jan. 29, 1957 |
| 2,785,314 | Grahame | Mar. 12, 1957 |
| 2,803,405 | Howell | Aug. 20, 1957 |
| 2,846,142 | Strachey et al. | Aug. 5, 1958 |

FOREIGN PATENTS

| | | |
|---|---|---|
| 507,259 | Belgium | Dec. 15, 1951 |